(12) United States Patent
Tries et al.

(10) Patent No.: US 11,536,193 B2
(45) Date of Patent: Dec. 27, 2022

(54) WASTEGATE ARRANGEMENT FOR AN EXHAUST GAS TURBOCHARGER

(71) Applicant: BMTS TECHNOLOGY GMBH & CO. KG, Stuttgart (DE)

(72) Inventors: Timo Tries, Weissach (DE); Fabian Haslinger, Mannheim (DE); Volker Tietsch, Weissach (DE); Franz Starke, Kornwestheim (DE); Niklas Rodeck, Stuttgart (DE); Carsten John, Ludwigsburg (DE)

(73) Assignee: BMTS Technology GmbH and Co. KG

(*) Notice: Subject to any disclaimer, the term of this patent is extended or adjusted under 35 U.S.C. 154(b) by 0 days.

(21) Appl. No.: 17/673,902

(22) Filed: Feb. 17, 2022

(65) Prior Publication Data
US 2022/0260007 A1 Aug. 18, 2022

(30) Foreign Application Priority Data
Feb. 18, 2021 (EP) .................................. 21157967

(51) Int. Cl.
| | | |
|---|---|---|
| *F02B 37/18* | (2006.01) | |
| *F01D 17/10* | (2006.01) | |
| *F02B 39/16* | (2006.01) | |

(52) U.S. Cl.
CPC .......... *F02B 37/186* (2013.01); *F01D 17/105* (2013.01); *F02B 39/16* (2013.01); *F05D 2220/40* (2013.01); *F05D 2260/606* (2013.01)

(58) Field of Classification Search
CPC ...... F02B 37/186; F02B 39/16; F01D 17/105; F05D 2220/40; F05D 2260/606
See application file for complete search history.

(56) References Cited

U.S. PATENT DOCUMENTS

| 4,901,987 A | 2/1990 | Greenhill et al. |
| 5,558,393 A | 9/1996 | Hawkins et al. |

(Continued)

FOREIGN PATENT DOCUMENTS

| DE | 102011077766 A1 | 12/2012 |
| DE | 102015108284 A1 | 12/2016 |

(Continued)

OTHER PUBLICATIONS

European Patent Office Search Report from corresponding patent application No. 21157967.7, dated Jul. 9, 2021, 7 pages (not prior art).

*Primary Examiner* — Audrey B. Walter
*Assistant Examiner* — Edward Bushard
(74) *Attorney, Agent, or Firm* — Lucian Wayne Beavers; Patterson Intellectual Property Law, PC

(57) ABSTRACT

The invention relates to a wastegate arrangement for an exhaust gas turbocharger comprising a turbine housing (10) having a bearing mount (19), wherein the bearing mount (19) receives a bearing bushing (50) having a drilled hole (51), wherein the drilled hole (51) holds a shaft (31) having a first shaft end (31.1) disposed in the turbine housing (10), and having a second shaft end (31.2) retained outside the turbine housing (10), wherein the first shaft end (31.1) of the shaft (31) is coupled to a wastegate flap (37) disposed in the turbine housing (10) to close a wastegate passage (15) in a closed position and to release a wastegate passage (15) in an open position, wherein the shaft (31) bears an actuating lever (24) at its second shaft end (31.2) outside of the turbine housing (10), wherein the bearing bushing (50) has a second bearing bushing end (53), which faces the actuating lever (24) in the zone of the outer surface of the turbine housing (10), wherein a spring element (40), a second spring end (40.2) of which rests indirectly or directly on a support surface (24.2) of the actuating lever (24), is used, and (Continued)

wherein the support surface (24.2) is disposed at least sectionally around the shaft (31). In order to achieve improved operational reliability in such a wastegate arrangement, provision is made in accordance with the invention for the turbine housing (10) to have a pressure surface (18), that the pressure surface (18) is disposed offset in the axial direction of the shaft (31) in the direction of the first shaft end (31.1) with respect to the second bearing bushing end (53), and for a first spring end (40.1) of the spring element (40), which faces away from the second spring end (40.2), to rest on the pressure surface (18) of the turbine housing (10) to generate a spring preload between the pressure surface (18) and the support surface (24.2).

17 Claims, 4 Drawing Sheets

(56) References Cited

U.S. PATENT DOCUMENTS

| | | |
|---|---|---|
| 2012/0319020 A1 | 12/2012 | Doehler et al. |
| 2018/0094573 A1* | 4/2018 | Schoenherr ........... F02B 37/186 |
| 2020/0370470 A1 | 11/2020 | Yoshimi et al. |
| 2021/0123360 A1* | 4/2021 | Uneura ................ F16C 23/048 |

FOREIGN PATENT DOCUMENTS

| | | |
|---|---|---|
| EP | 3477074 A1 | 5/2019 |
| JP | 2017032067 A | 2/2017 |

* cited by examiner

WASTEGATE ARRANGEMENT FOR AN EXHAUST GAS TURBOCHARGER

BACKGROUND OF THE INVENTION

Field of the Invention

The invention relates to a wastegate arrangement for an exhaust gas turbocharger comprising a turbine housing having a bearing mount, wherein the bearing mount holds a bearing bushing having a drilled hole or wherein the bearing mount forms the drilled hole, wherein the drilled hole holds a shaft having a first shaft end disposed in the turbine housing and having a second shaft end retained outside the turbine housing, wherein the first shaft end of the shaft is coupled to a wastegate disposed inside the turbine housing to close a wastegate passage in a closed position and to release a wastegate passage in an open position, wherein the shaft bears an actuating lever at its second shaft end outside of the turbine housing, wherein the bearing bushing has a second bearing bushing end, which faces the actuating lever in the zone of the outer surface of the turbine housing, or wherein a housing surface of the turbine housing faces the actuating lever on the outside, wherein a spring element, which rests indirectly or directly on a second spring end on a support surface of the actuating lever, is used and wherein the support surface is disposed at least sectionally around the shaft.

Description of the Prior Art

US 2018/0094573 A1 discloses an exhaust gas turbocharger having a turbine housing, wherein a wastegate passage is formed in the turbine housing. A wastegate valve can be used to optionally open or close this wastegate passage. For this purpose, the wastegate valve has a wastegate flap that closes a sealing seat of the wastegate passage in the closed state of the wastegate valve. The wastegate flap is coupled to an arm of the wastegate valve. The arm is integrally connected to a shaft of the wastegate valve. A bearing bushing is used to support the shaft in the turbine housing. The former has a drilled hole through which the shaft is passed. On the outer surface of the turbine housing, an actuating lever is coupled to the shaft for co-rotation. An actuator can be used to adjust the actuating lever between the open position and the closed position of the wastegate valve. A shoulder is formed on the wastegate valve, in the zone between the arm and the shaft, which shoulder abuts a first end of the bearing bushing. In this way, the axial adjustment in the direction of the longitudinal axis of the shaft is blocked in one direction. A spring element is inserted between the actuating lever and the facing end of the bearing bushing at the end of the shaft that bears the actuating element. This spring element applies a preload to the shaft to prevent any axial displacement of the shaft in the bearing bushing. During operation, the axial play of the shaft changes due to temperature changes or vibrations. The spring element compensates this change in axial play. Because of design considerations, it is desired for the gap distance between the actuating lever and the facing end of the bearing bushing to be kept as small as possible. Production-related height changes, such as those resulting from the installation of the bearing bushing in the turbine housing or from the connection between the shaft and the actuating lever, have a high proportion in relation to the width of the gap in which the spring element is located. When the spring elements proposed in US 2018/0094573 A1 are installed, the preload force can change very significantly due to the spring rate of the spring element if the possible tolerance range is used to its full potential. In extreme cases, an unintentional block contact can also occur, causing lasting damage to the spring element. Furthermore, the small contact surfaces of the bearing bushing and the actuating lever, against which the spring element rests, result in high contact forces. These promote wear of the spring element or the adjacent components, which in extreme cases can result in component failure. Finally, a shaft tilted relative to the bearing bushing can result in the spring element being subjected to non-uniform stress at a high spring rate.

SUMMARY OF THE INVENTION

The invention addresses the problem of providing a wastegate arrangement of the type mentioned above, in which the vibration excitation of the wastegate valve to the bearing bushing is optimized in favor of improved operational reliability.

This problem is solved in that the turbine housing has a pressure surface, in that the pressure surface is disposed offset in the axial direction of the shaft in the direction towards the first shaft end with respect to the second bearing bushing end or the housing surface, and in that a first spring end of the spring element, which faces away from the second spring end, rests on the pressure surface of the turbine housing to generate a spring preload between the pressure surface and the support surface of the actuating lever.

In the design of a wastegate arrangement according to the invention, the spring element is not used in the gap zone between the second bearing bushing end and the actuating lever, but in the enlarged axial gap between an outer pressure surface on the turbine housing and the support surface of the actuating lever, in contrast to the teaching of the prior art. The small axial clearance between the second bearing bushing end and the actuating lever desired due to design considerations can in particular be kept unchanged or reduced further. Accordingly, the design of the bearing bushing no longer has any influence on the preload of the spring element used as a vibration damper. The additional height gained renders in particular optimizing the spring rate of the spring element to smaller values possible, because a greater usable spring travel can be implemented. In particular, the spring element may have a significantly flatter spring characteristic than in the prior art. This means that production-related fluctuations and/or wear during operation have a negligible effect on the preload, i.e., the preload force changes only slightly as a result of these effects. Furthermore, assembly is considerably simplified. Overall, the forces transmitted from the spring element to the support surface or the pressure surface can also be selected to be smaller, maintaining a reliable preload. The lower preload forces also reduce the loads on the adjacent components. In this way, operational safety is also improved. Furthermore, the design according to the invention allows for a larger support surface or a larger pressure surface to be selected, further reducing the component loads.

According to one conceivable variant of the invention, provision can be made for the spring element to be aligned with its inner contour or with a part of its inner contour on the shaft and, in particular, to be centered on the latter. This design variant is particularly advantageous if the turbine housing has the drilled hole, in which the shaft is directly guided.

According to a preferred embodiment of the invention, provision can be made for the support surface to extend in a ring-like manner around the second bearing bushing end. In this way, a large-surface support of the turbine housing is feasible.

If provision is made for the pressure surface to be routed to the outer circumference of the bearing bushing in the zone of the second bearing bushing end in such a way that a shoulder is formed between the pressure surface and the outer circumference of the bearing bushing, then the bearing bushing can be used to center the spring element. However, it is also conceivable that for this purpose the pressure surface is part of a shoulder machined into the turbine housing, which shoulder is formed as a step on the turbine housing extending ring-like around the shaft.

The design according to the invention can be used to minimize the gap zone between the actuating lever and the second bearing bushing end. This not only results in a reduction in parts costs, but also in an optimization of installation space. According to the invention, provision can therefore be made in particular for the axial distance in the direction of the longitudinal axis of the shaft between the second bearing bushing end and the part of the actuating lever opposite from the second bearing bushing end to be at most 0.5 mm. Optionally the gap may be zero.

In the context of the invention, it has been shown that for common turbocharger applications, the optimal axial distance between the support surface and the pressure surface in the direction of the longitudinal axis of the shaft ranges from 2 mm to 4 mm. Then spring elements optimized in terms of their spring characteristics and providing sufficient stable support for the wastegate valve shaft can be used.

For instance, the spring rate of the spring element may be in the range from 30 N/mm to 100 N/mm.

A particularly preferred design variant is such that the spring element extends ring-like around the shaft in the zone between the support surface and the pressure surface.

According to the invention, provision can further be made for the spring element to have at least one spring ring, which is formed from a spring plate and is disposed around the shaft, wherein the spring ring has alternating elevations and depressions distributed along its circumference at its zone facing the first and/or second spring end, wherein the spring ring having the elevations and/or depressions preferably is of undulating design to be able to select the desired spring characteristics in an ideal manner. The spring ring can be designed in such a way that it fully surrounds the shaft or only extends across a part of the circumference of the shaft.

If provision is made for the at least one spring ring to have two to five elevations or depressions at its zone facing the first and/or second spring end, the preload in the assembly zone can be set particularly precisely. It has also been shown that this design can be used to use the full overall height of the spring and to minimize the block height of the spring.

A wastegate arrangement according to the invention may also be characterized in that the spring element comprises at least two spring rings that are integrally interconnected to form a spring assembly. Compared with conventional coil springs, such spring elements allow a flatter spring characteristic to be achieved in the same space in favor of a reduced spring rate.

Particularly preferably, provision can be made for the spring plate of the spring element in the zone of the first and/or second spring end to form an at least partially circumferential support ring, which is disposed in a plane that preferably extends in parallel to the pressure surface and/or the support surface. The circumferential support ring(s) can be used to provide planar force transfer from the spring element to the compression surface or support surface. This significantly reduces the contact loads to the adjacent turbine housing or to the adjacent actuating lever in favor of reduced wear. Furthermore, provision can also be made for the first spring ring to be bent from the support ring and preferably the second spring ring is bent from the first spring ring, in this way reducing the parts requirement for the spring element.

The first and/or the second support ring do not have to be in direct contact with the turbine housing or the bearing bushing and/or the actuating lever. Rather, it is also conceivable that an indirect contact is implemented. In particular, it is conceivable that a component is inserted for thermal decoupling. Furthermore, it is conceivable that a component, which can be formed by a ring element, for instance, is inserted to reduce friction.

A preferred variant of the invention is such that the shaft has a shaft section of reduced diameter at its second shaft end in such a way that a shoulder is formed in the transition to the shaft zone of increased diameter in the direction of the shaft zone adjoining the first shaft end, and that the actuating lever rests against this shoulder and is bonded, preferably welded, to the shaft and/or connected in a form-fitting manner. The actuating lever can be aligned in the correct position on the shoulder and then connected to the shaft. This eliminates the need to use a gauge, such as a welding gauge, when a welded joint is selected.

It is also conceivable that the pressure surface has an alignment section projecting radially outwards from the longitudinal axis of the shaft beyond the spring element and facing an alignment surface of the actuating lever. In such a design, for instance, the shaft can be manufactured without the previously mentioned shaft section that has been reduced in diameter. A gauge, for instance a welding gauge, can then be used between the alignment surface and the alignment section to be able to produce a precisely fitting bond between the actuating lever and the shaft.

A possible embodiment of the invention may be such that the wastegate flap has a mounting section, preferably movable, coupled to an arm of a wastegate valve. In this way, the wastegate flap can align itself exactly opposite from the sealing seat of the wastegate passage. Preferably, provision can also be made for the arm to be integrally coupled to the shaft and wherein further preferably in the zone of the second shaft end a counter bearing is provided, which faces the first bearing bushing end to form an axial stop.

For reliable operation of the wastegate valve, provision can be made for the shaft to be connected to an actuating unit of an actuator via a lever gear, and wherein the lever gear comprises at least the actuating lever and an articulated lever connected to the actuating lever in an articulated manner.

According to one variant of the invention, provision can be made for the spring element to be designed as a ring-like component that has a slot in the circumferential direction to permit the spring element to be pushed onto the shaft in the radial direction. In this case, the spring element can be pushed laterally onto the shaft to provide support between the actuating lever and the turbine housing after the shaft has been mounted in the turbine housing.

BRIEF DESCRIPTION OF THE DRAWINGS

The invention is explained in greater detail below based on an exemplary embodiment shown in the drawings. In the Figures.

DETAILED DESCRIPTION

Figure 1:
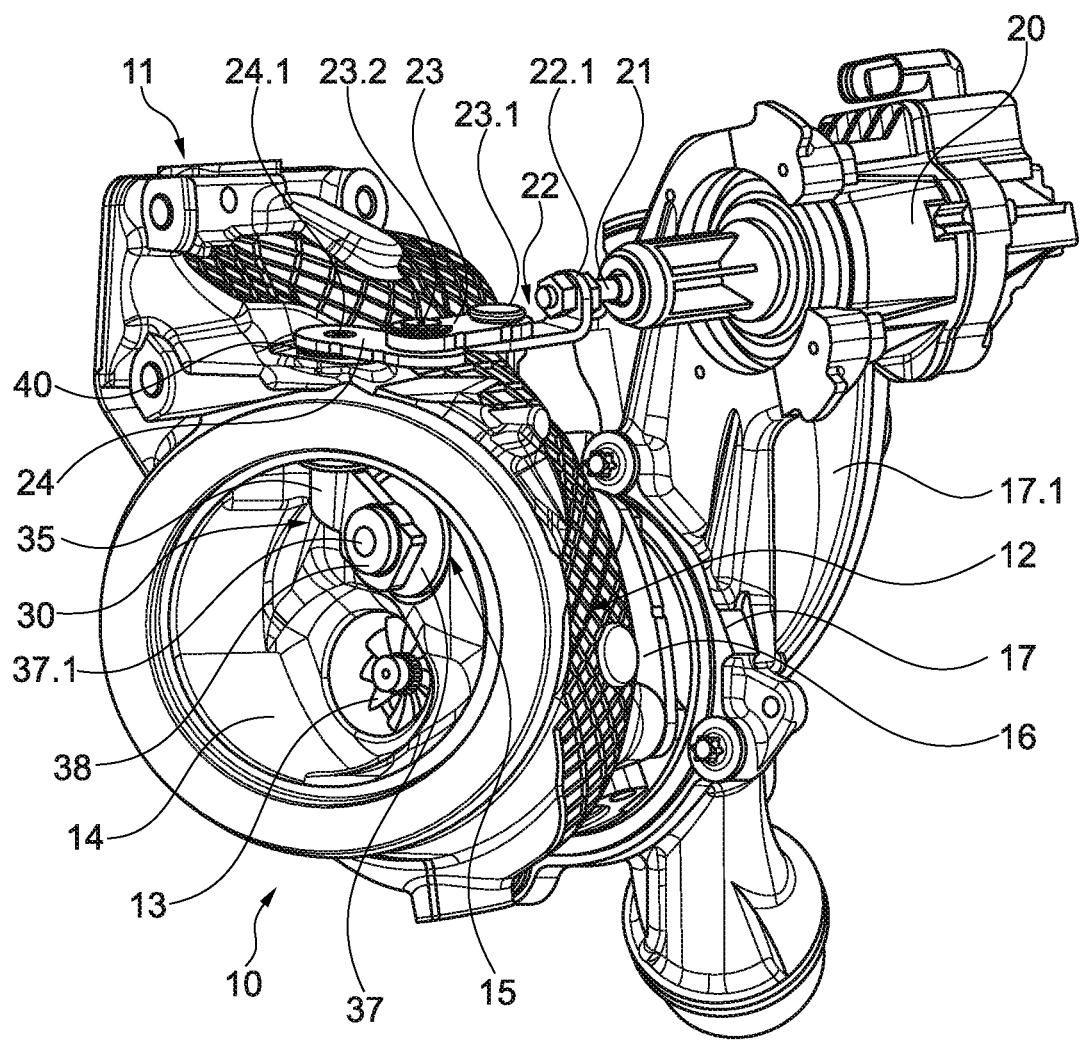
FIG. 1 shows a perspective view of an exhaust gas turbocharger.
Figure 2:
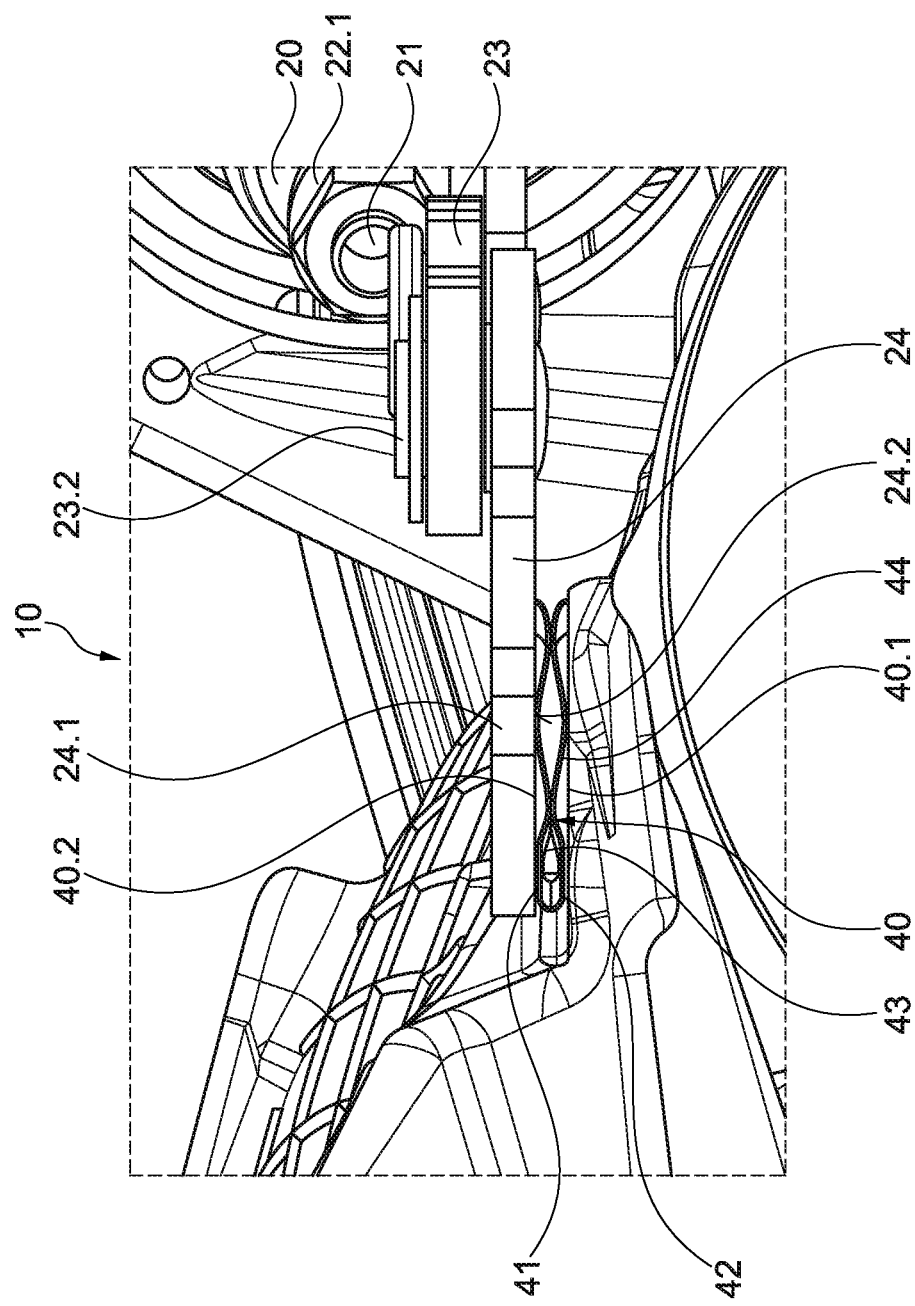
FIG. 2 shows a detailed representation taken from FIG. 1.

FIG. 1 shows an exhaust gas turbocharger having a bearing housing 16, to which a turbine housing 10 is attached on one side. On the opposite side of the bearing housing 16, a compressor housing 17 is connected to the bearing housing 16. A drive shaft is mounted in the bearing housing 16, one end of which drive shaft bears a turbine wheel 13, which is disposed in the turbine housing 10. At the other end of the drive shaft, a compressor wheel is held in the compressor housing 17.

The exhaust gas turbocharger has an extension arm 17.1, which may be integrally connected to the compressor housing 17, for instance. The cantilever 17.1 bears an actuator 20. This actuator 20 has a drive, for instance an electric or pneumatic drive, which can be used to adjust an actuating unit 21, preferably linearly. It is also conceivable that the actuator 20 is used to adjust the actuating unit 21 along an arcuate path, in particular rotationally.

The turbine housing 10 has a gas inlet opening 11. It can be used to route the exhaust gas flow or a partial exhaust gas flow originating at an internal combustion engine into a guide channel 12 of the turbine housing 10; preferably the guide channel 12 is designed as a spiral channel positioned around the turbine wheel 13. The exhaust gas flow can be fed to the turbine wheel 13 through the guide channel 12. At the turbine wheel 13, the exhaust gas stream expands into a downstream outlet chamber 14, causing the drive shaft to rotate.

A wastegate passage 15 is further provided in the turbine housing 10. This wastegate passage 15 establishes a spatial connection between the guide channel 12 and the outlet chamber 14. In that way, the wastegate passage 15 forms a bypass for the exhaust gas flow, bypassing the turbine wheel 13.

A wastegate valve 30 can be used to close the wastegate passage 15 in a known manner. Accordingly, the wastegate valve 30 can be moved between a closed position and an open position. In the closed position, a wastegate flap 37 of the wastegate valve 30 is seated on a sealing surface of the wastegate passage 15 and closes the wastegate passage 15. In the open position, the wastegate flap 37 releases the sealing surface, thereby opening the wastegate passage 15.

The actuator 20 is used to adjust the wastegate valve 30, as will be explained in more detail later.

Figure 5:
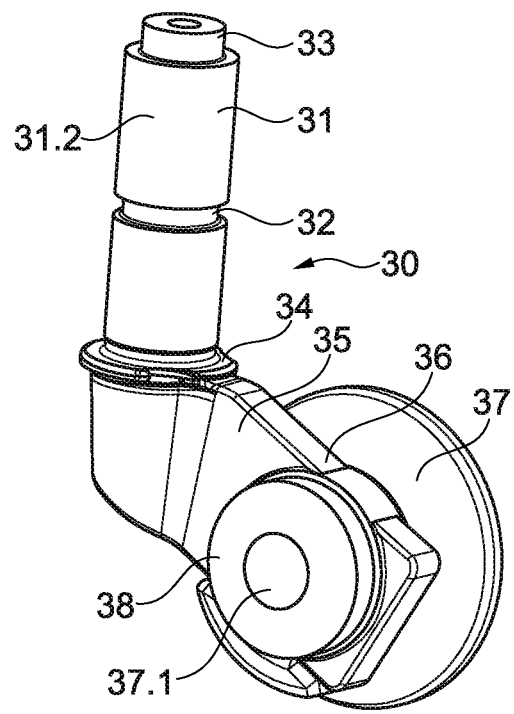
Figure 6:
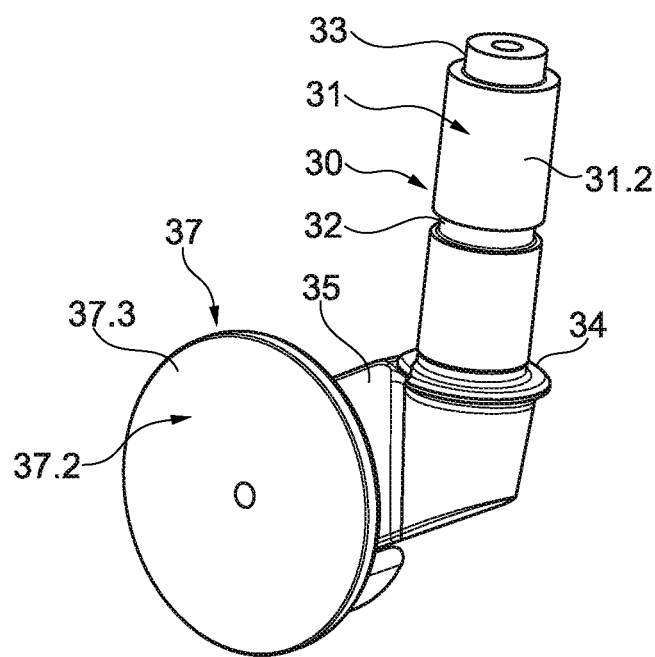

FIGS. 5 and 6 show an example of a possible embodiment of a wastegate valve 30. As shown in these embodiments, the wastegate valve 30 includes the wastegate flap 37. In particular, the wastegate flap can be plate-shaped. It has an inner surface 37.2 and a sealing section 37.3 disposed in the zone of the inner surface 37.2. In this exemplary embodiment, the sealing section 37.3 is plane-parallel to the inner surface 37.2. However, it is also conceivable that the sealing section 37.3 is formed by a circumferential projection, for instance a bulge.

The wastegate flap 37 has a mounting section 37.1. This attachment section 37.1 can be used to integrally connect the wastegate flap 37 to a retaining section 36. This retaining section 36 may be part of an arm 35 of the wastegate valve 30. In the present exemplary embodiment, a connecting element 38 is used to connect the wastegate flap 37 at its attachment section 37.1 to the arm 35, preferably movably. However, it is also conceivable that there is a fixed connection to the arm 35. It is further conceivable that the wastegate flap 37 is integrally connected to the arm 35.

The drawings further show that the wastegate valve 30 includes a shaft 31, which is preferably integrally connected to the arm 35 via a connecting section. A counter bearing 34 may be provided in the zone between a first shaft end 31.1, which zone faces the wastegate flap 37. In for instance, this counter bearing 34 can be designed as circumferential shaft shoulder. It is also conceivable that the counter bearing 34 has one or more radial projections.

The shaft 31 has a second shaft end 31.2 opposite from the first shaft end 31.1. As shown in FIGS. 5 and 6 in the present exemplary embodiment, a shaft section 33 of reduced diameter may be disposed in the zone of the second shaft end 31.2. This results in a shaft shoulder between the shaft piece 33 and the adjoining zone of the shaft 31, the diameter of which has been enlarged.

However, it is also conceivable that the wastegate valve 30 is manufactured without the end shaft piece 33 and has a uniform diameter at the end.

It is also conceivable that a circumferential groove 32 is machined into the shaft 31 in the zone between the first shaft end 31.1 and the second shaft end 31.2.

Figure 3:
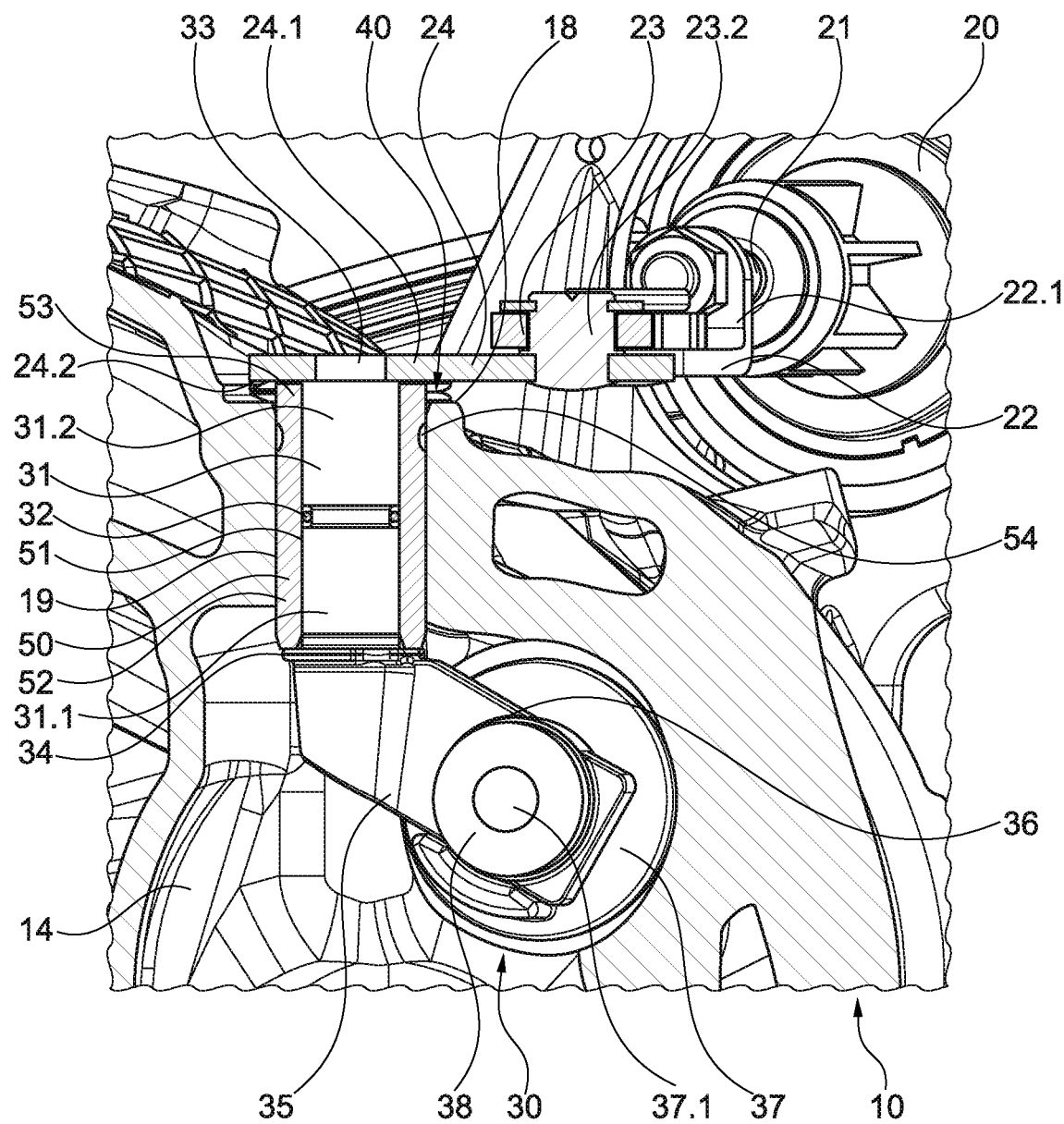
FIG. 3 shows a partial section of a turbine of the exhaust gas turbocharger of FIG. 1.

As FIG. 3 shows, the turbine housing 10 has a bushing holder 19. A bearing bushing 50 can be inserted, preferably pressed, into this bushing holder 19. To secure the bearing bushing 50 in the turbine housing 10, a form-fit connection may optionally be provided between the turbine housing 10 and the bearing bushing 50. For instance, it is conceivable that the bearing bushing 50 has a bushing groove 54 that is aligned with a groove in the bushing holder 19 of the turbine housing 10. A positive locking element, for instance a pin, can be inserted into the zone between the bushing groove 54 and the groove, which pin then blocks the axial displacement of the bearing bushing 50 in the turbine housing 10.

The bearing bushing 50 has a first bearing bushing end 52, which is retained in the turbine housing 10, namely in the zone of the outlet chamber 14. In this case, the first bearing bushing end preferably protrudes beyond the adjacent body contour of the turbine housing 10, in particular to form an abutment for the counter bearing 34 of the wastegate valve 30. The first bearing bushing end 52 may also be referred to as a bearing bushing inner end 52.

The bearing bushing 50 has a second bearing bushing end 53 opposite from the first bearing bushing end 52, which is disposed outside the turbine housing 10. In accordance with the invention, the arrangement outside the turbine housing 10 includes an arrangement wherein the second bearing bushing end 53 is also flush with a surface contour of the turbine housing 10, or wherein the second bearing bushing end 53 is located within the bushing holder 19. The second bearing bushing end 53 may also be referred to as a bearing bushing outer end 53.

As FIG. 3 shows, the bearing bushing 50 has a drilled hole 51. The drilled hole 51 forms a bearing mount for the shaft 31 of the wastegate valve 30. The second shaft end 31.2 of the shaft 31 can be inserted into the drilled hole 51, starting from the outlet chamber 14. The drilled hole 51 may also be referred to as a cylindrical bore 51. The cylindrical bore 51 may described as a cylindrical bore 51 of the turbine housing 10. In the embodiment shown in FIG. 3 the cylindrical bore 51 is indirectly formed in the turbine housing 10 by forming the cylindrical bore 51 in the bearing bushing 50 which is received in the turbine housing 10. Alternatively, the bearing bushing 50 may be eliminated and the cylindrical bore 51 may be formed directly in the turbine housing 10. In such alternative embodiment the turbine housing 10 may be formed to integrally encompass the space occupied in FIG. 3 by the bearing bushing 50 so that an integral annular ridge extends outward from the outer surface of the turbine housing in the space occupied in FIG. 3 by the second bearing bushing end 53, that integral annular ridge defining a further housing surface on its end in the place of the outer end of the bearing bushing 50.

According to one embodiment, an O-ring or other heat-resistant seal, for instance a heat-resistant sealing ring, may be inserted into the groove 32 of the shaft 31. In this way, the shaft 31 is sealed relative to the drilled hole 51. However, it is also conceivable that the fit between the shaft 31 and the drilled hole 51 is selected such that the fit geometry makes for sufficient tightness.

The insertion motion of the wastegate valve 30 into the bearing bushing 50 can be limited, for instance, by the counter bearing 34. It strikes against the first bearing bushing end 52.

In the inserted state, the second shaft end 31.2 of the shaft 31 protrudes beyond the second bearing box end 53. In the embodiment shown in the drawing, the shaft section 33 of the shaft 31 protrudes beyond the bearing bushing 50. If a shaft 31, which does not have a shaft section 33 having a reduced diameter cross-section, is used, a corresponding end section of the shaft 31 protrudes beyond the bearing bushing 50.

An actuating lever 24 can be placed on the second shaft end 31.2. For this purpose, the actuating lever 24 has a matching mount that can be placed on the shaft piece 33 (or the end section of the shaft 31). The touchdown motion of the actuating lever 24 is limited by the shoulder of the shaft 31, which is adjacent to the shaft piece 33, as shown in FIG. 3.

The actuating lever 24 can be connected to the shaft 31 in any way. For instance, it is conceivable that a bond, for instance a welded connection, is established between the actuating lever 24 and the shaft 31, in particular the shaft piece 33.

FIG. 3 further shows that there is an axial clearance between the second bearing bushing end 53 and the facing side of the actuating lever 24.

Figure 4:
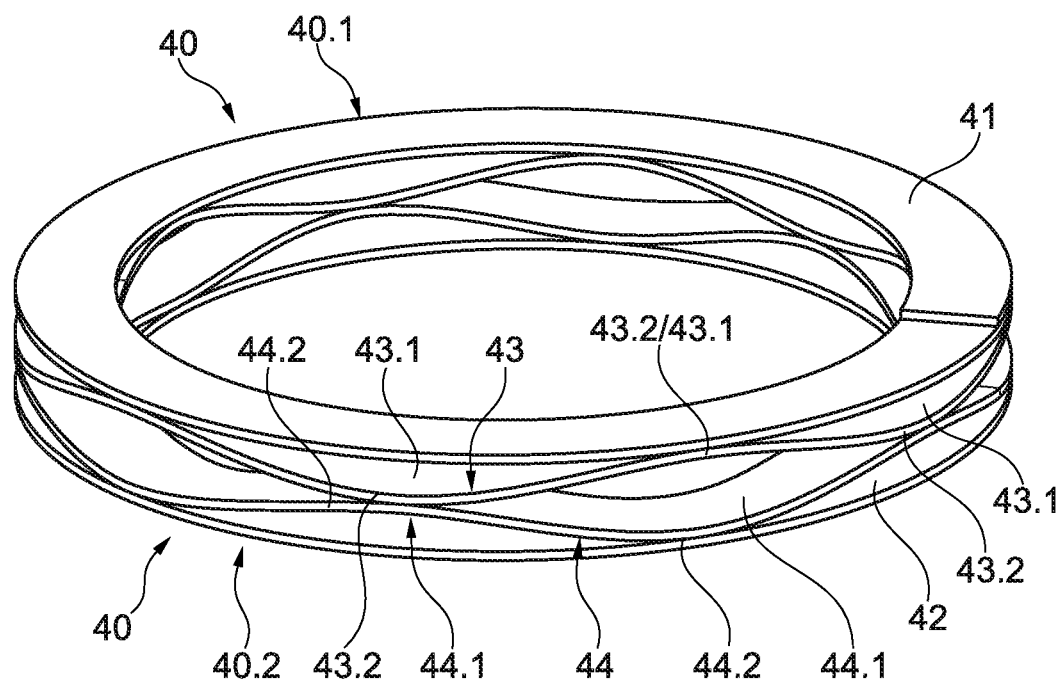
FIG. 4 shows a perspective view of a spring element and FIGS. 5 and 6 show a perspective view of a wastegate valve.

Furthermore, FIG. 3 shows that a spring element 40 is installed between the actuating lever 24 and the turbine housing 10. For instance, a spring element 40, as shown in FIG. 4, may be used. The spring element 40 may also be referred to as a spring 40.

FIG. 4 illustrates that the spring element 40 has two ring-like support rings 41, 42. The support rings 41, 42 are each disposed in a plane, wherein the planes are preferably disposed in parallel to each other. The first support ring 41 faces a first spring end 40.1 and the second support ring faces a second spring end 40.2.

One or more spring rings 43, 44 are disposed between the support rings 41, 42. In this exemplary embodiment two spring rings 43, 44 are used. The spring rings 43 are undular in shape. Accordingly, the spring ring 43 facing the first spring end 40.1 has alternating depressions 43.1 and elevations 43.2. On the opposite side facing the second spring end 40.2, the spring ring 43 forms matching elevations 43.2 and depressions 43.1. The second spring ring 44 is of substantially the same design as the first spring ring and has elevations 44.2 and depressions 44.1. The spring rings 43 and 44 may be referred to as a first spring ring 43 and a second spring ring 44.

On the side facing the support ring 41, the elevations 43.2 of the spring ring 43 rest on the support ring 41.

The elevations 44.2 of the spring ring 44 rest on the support ring 42 on its side facing the second spring end 40.2.

On the sides facing each other, the spring rings 43, 44 rest on each other in the zone of their facing elevations 43.2, 44.2.

Preferably, the spring element 40 is made from a flat steel sheet blank, and further preferably both the support rings 41, 42 and the spring rings 43, 44 are integrally interconnected.

Particularly preferably, provision can be made for the spring element 40 to be made of a high-temperature-resistant steel material, in particular a strip-shaped steel sheet blank. For instance, it is conceivable that Inconel is used as the material.

As FIG. 4 shows, for this purpose the support ring 41 can form one end of the sheet blank. The support ring 41 extends from this end, and the spring rings 43 and 44 followed by the support ring 42 are bent from the support ring 41. The second support ring 42 then forms the second free end of the flat sheet blank.

It is also conceivable to use a spring element 40 which is essentially identical in construction to the spring element 40 shown in FIG. 4, but which is manufactured without at least one of the support rings 41, 42.

FIG. 3 illustrates that the first spring end 40.1 of the spring element 40 is supported relative to a support surface 24.2 of the actuating lever 24. Preferably, the spring element 40 is in flat contact with the support ring 41 there. The support surface extends at least sectionally, i.e. at least partially, around the shaft 31.

Preferably, provision can be made for the spring element 40 to be supported on a pressure surface 18 of the turbine housing 10 opposite to the support surface 24.2. For this purpose, the second support ring 42 of the spring element 40 can, for instance, rest on the pressure surface 18.

The pressure surface 18 is preferably formed by an annular surface which extends around the bearing bushing 50 and is directly or indirectly adjacent thereto. A direct connection also includes, in particular, a transition, in which the pressure surface 18 is connected to the bearing bushing 50 via an insertion bevel of the bushing holder 19.

In the assembled state, the spring element 40 is held in a preload state, wherein the spring element 40 transmits a preload force to the pressure surface 18 and to the support surface 24.2. In this way, the shaft 31 is held against the turbine housing 10 without clearance. Nevertheless, the spring element 40 can be used to compensate temperature-related length changes or vibrations.

FIG. 1 illustrates that a gear may be used to connect the actuating unit 21 of the actuator 20 to the shaft 31. Part of this gear is the actuating lever 24, which is connected to the shaft 31 for co-rotation. At its end facing away from the shaft 31, a joint 23.2 is used to swivel connect the actuating lever 24 to an articulated lever 23. The articulated lever 23 has a further joint 23.1, which is used to connect it to a connecting piece 22 in an articulated manner. The connecting piece 22 establishes the connection between the articulated lever 23 and the actuating unit 21. For this purpose, the connecting piece 22 has a fastening element 22.1, which is preferably detachably connected to the actuating unit 21. The actuating lever and the articulated lever may collectively be referred to as a lever gear or lever assembly.

The actuator 20 is used to linearly adjust the actuating unit 21 to adjust the wastegate valve 30 between an open position and a closed position. The gear is used to transmit this actuating motion to the actuating lever 24. This causes the actuating lever 24 to swivel. Because the shaft 31 is connected to the actuating lever 24 for co-rotation, the wastegate valve 30 is also swiveled in the bearing bushing 50.

As the above discussion illustrates, the exhaust gas turbocharger according to the invention has a wastegate arrangement including a turbine housing 10 having a bearing mount 19. The bearing mount 19 holds a bearing bushing 50, which supports a shaft 31 in a drilled hole 51. The wastegate flap 37 of the wastegate valve 30 is coupled to the shaft 31 at the first shaft end 31.1. The second shaft end 31.2 of the shaft 31 bears an actuating lever 24 outside the turbine housing. The bearing bushing 50 has a second bearing bushing end 53, which faces the actuating lever 24 in the zone of the outer surface of the turbine housing 10. According to the invention, a spring element 40 is used, a second spring end 40.2 of which rests indirectly or directly on a support surface 24.2 of the actuating lever 24. Further, the turbine housing 10 has a pressure surface 18 that is offset by an axial distance in the axial direction of the shaft 31 towards the first shaft end 31.1 relative to the second bearing bushing end 53. The spring element 40 supports a second spring end 40.2, on the pressure surface 18 of the turbine housing 10 to create a spring preload between the pressure surface 18 and the support surface 24.2. The axial distance by which the pressure surface 18 is offset relative to the second bearing bushing end 53 may also be described as an axial distance by which the pressure surface 18 is offset from an outer end of the cylindrical bore 51.

In the exemplary embodiment of the invention described above and shown in the drawings, the shaft 31 of the wastegate valve 30 is indirectly supported, for instance by the bearing bushing 50 in the turbine housing 10. However, it is also conceivable that the shaft 31 is mounted directly in a drilled hole of the turbine housing 10.

The invention claimed is:

1. A wastegate arrangement for an exhaust gas turbocharger, comprising:
   a turbine housing including a cylindrical bore and a pressure surface at least partially surrounding the cylindrical bore and offset by an axial distance along an axis of the cylindrical bore from an outer end of the cylindrical bore;
   a shaft received in the cylindrical bore, the shaft including a first shaft end disposed within the turbine housing and a second shaft end extending outside of the turbine housing;
   a wastegate flap connected to the first shaft end within the turbine housing, the wastegate flap being configured to be moved between a closed position wherein the wastegate flap closes a wastegate passage of the turbine housing and an open position wherein the wastegate passage is open;
   an actuating lever attached to the second shaft end outside of the turbine housing, the actuating lever including a support surface facing the turbine housing; and
   a spring disposed at least partially around the shaft, the spring being received between the support surface of the actuating lever and the pressure surface of the turbine housing so that the spring exerts a spring pressure on the pressure surface to generate a spring preload between the turbine housing and the support surface of the actuating lever;
   wherein the turbine housing includes a bearing mount defined therein; and
   wherein the wastegate arrangement further includes a bearing bushing received in the bearing mount of the turbine housing, the bearing bushing having the cylindrical bore defined therethrough, the bearing bushing including a bearing bushing outer end facing the actuating lever;
   wherein the spring is disposed at least partially around the bearing bushing; and
   wherein the outer end of the cylindrical bore is defined by the bearing bushing outer end and the bearing bushing outer end extends beyond the pressure surface to define the axial distance by which the pressure surface is offset along the axis of the cylindrical bore from the outer end of the cylindrical bore.

2. The wastegate arrangement of claim 1, wherein:
   the support surface extends in an annular manner around the bearing bushing outer end.

3. The wastegate arrangement of claim 1, wherein:
   the support surface surrounds an outer circumference of the bearing bushing outer end.

4. The wastegate arrangement of claim 1, further comprising:
   an arm integrally coupled to the shaft;
   wherein the wastegate flap includes a mounting section connected to the arm; and
   wherein the shaft includes a counter bearing formed on the shaft and facing an inner end of the bearing bushing to form an axial stop for the bearing bushing.

5. The wastegate arrangement of claim 1, wherein:
   the spring has a spring rate in a range of from 30 N/mm to 100 N/mm.

6. The wastegate arrangement of claim 1, wherein:
   the spring extends ring-like around the shaft between the support surface and the pressure surface.

7. The wastegate arrangement of claim 1, wherein:
   the shaft includes a reduced diameter shaft section at an outer shaft end such that a shaft shoulder is formed; and
   the actuating lever bears against the shaft shoulder and is bonded to the shaft or connected to the shaft in a form-fitting manner.

8. The wastegate arrangement of claim 1, further comprising:
   an actuator; and
   a lever assembly connecting the actuator to the shaft to rotate the shaft and move the wastegate flap between the open and closed positions, the lever assembly including the actuating lever and an articulated lever connected to the actuating lever in an articulated manner.

9. The wastegate arrangement of claim 1, wherein:
   the turbine housing includes a gas inlet opening into a guide channel, the guide channel being directed to a turbine wheel;
   the turbine housing further includes an outlet chamber disposed downstream of the turbine wheel in a direction of flow; and
   the wastegate passage extends between the guide channel and the outlet chamber to form a bypass channel between the guide channel and the outlet chamber.

10. The wastegate arrangement of claim 1, wherein:
    the axial distance is in a range of from 2 mm to 4 mm.

11. The wastegate arrangement of claim 10, wherein:
    an axial distance between the bearing bushing outer end and the actuating lever is at most 0.5 mm.

12. The wastegate arrangement of claim 1, wherein:
    the spring includes at least one spring ring formed from a spring plate and having alternating elevations and depressions distributed along a circumference of the spring ring and facing an axial end of the spring.

13. The wastegate arrangement of claim 12, wherein:
the at least one spring ring is of undulating design.

14. The wastegate arrangement of claim 12, wherein:
the at least one spring ring includes from two to five elevations or depressions.

15. The wastegate arrangement of claim 12, wherein:
the at least one spring ring includes at least first and second spring rings.

16. A wastegate arrangement for an exhaust gas turbocharger, comprising:
a turbine housing including a cylindrical bore and a pressure surface at least partially surrounding the cylindrical bore and offset by an axial distance along an axis of the cylindrical bore from an outer end of the cylindrical bore;
a shaft received in the cylindrical bore, the shaft including a first shaft end disposed within the turbine housing and a second shaft end extending outside of the turbine housing;
a wastegate flap connected to the first shaft end within the turbine housing, the wastegate flap being configured to be moved between a closed position wherein the wastegate flap closes a wastegate passage of the turbine housing and an open position wherein the wastegate passage is open;
an actuating lever attached to the second shaft end outside of the turbine housing, the actuating lever including a support surface facing the turbine housing; and
a spring disposed at least partially around the shaft, the spring being received between the support surface of the actuating lever and the pressure surface of the turbine housing so that the spring exerts a spring pressure on the pressure surface to generate a spring preload between the turbine housing and the support surface of the actuating lever;
wherein the spring includes first and second spring rings each having alternating elevations and depressions distributed along a circumference of the spring ring and facing an axial end of the spring; and
wherein the spring includes first and second support rings ring disposed in planes extending parallel to the pressure surface and the support surface, the first spring ring being bent from the first support ring and the second spring ring being bent from the first spring ring and the second support ring so that the first and second support rings and the first and second spring rings are all integrally formed.

17. A wastegate arrangement for an exhaust gas turbocharger, comprising:
a turbine housing including a cylindrical bore and a pressure surface at least partially surrounding the cylindrical bore and offset by an axial distance along an axis of the cylindrical bore from an outer end of the cylindrical bore;
a shaft received in the cylindrical bore, the shaft including a first shaft end disposed within the turbine housing and a second shaft end extending outside of the turbine housing;
a wastegate flap connected to the first shaft end within the turbine housing, the wastegate flap being configured to be moved between a closed position wherein the wastegate flap closes a wastegate passage of the turbine housing and an open position wherein the wastegate passage is open;
an actuating lever attached to the second shaft end outside of the turbine housing, the actuating lever including a support surface facing the turbine housing; and
a spring disposed at least partially around the shaft, the spring being received between the support surface of the actuating lever and the pressure surface of the turbine housing so that the spring exerts a spring pressure on the pressure surface to generate a spring preload between the turbine housing and the support surface of the actuating lever;
wherein the spring is an annular spring having a slot in a circumferential direction to permit the spring to be pushed onto the shaft in a radial direction.

* * * * *